US006958096B2

(12) United States Patent
Lindholm

(10) Patent No.: US 6,958,096 B2
(45) Date of Patent: Oct. 25, 2005

(54) SYSTEMS AND METHODS FOR COATING OPTICAL FIBER

(75) Inventor: Eric A. Lindholm, Belchertown, MA (US)

(73) Assignee: Furukawa Electric North America, Inc., Norcross, GA (US)

( * ) Notice: Subject to any disclaimer, the term of this patent is extended or adjusted under 35 U.S.C. 154(b) by 61 days.

(21) Appl. No.: 10/633,734

(22) Filed: Aug. 4, 2003

(65) Prior Publication Data

US 2005/0028731 A1 Feb. 10, 2005

(51) Int. Cl.[7] .............................................. B05C 3/12

(52) U.S. Cl. .................... 118/407; 118/420; 427/163.2; 65/491; 65/529

(58) Field of Search ............................... 118/407, 420; 427/163.2; 65/491, 529

(56) References Cited

U.S. PATENT DOCUMENTS 4,539,226 A * 9/1985 Paek et al. ............... 427/163.2

\* cited by examiner

*Primary Examiner*—Laura Edwards
(74) *Attorney, Agent, or Firm*—Daniel Kim, Esq.

(57) ABSTRACT

A fiber coating applicator includes a chamber and a cup positioned over the chamber. The cup is connected to the chamber by an entrance aperture. The chamber includes an exit aperture opposite the entrance aperture. The cup, entrance aperture, chamber, and exit aperture define a pathway for a fiber, such as an optical fiber, to be coated. The chamber further includes an input port for pumping a coating material into the chamber. The entrance aperture is dimensioned such that as a fiber travels along the pathway and coating material is pumped into the chamber, coating material travels upward through the entrance aperture around the fiber into the cup, the upward flow of coating material being restricted by the fiber and entrance aperture such that there is a hydrostatic pressure in the chamber. The exit aperture is dimensioned to shape coating material around a fiber traveling along the pathway.

9 Claims, 12 Drawing Sheets

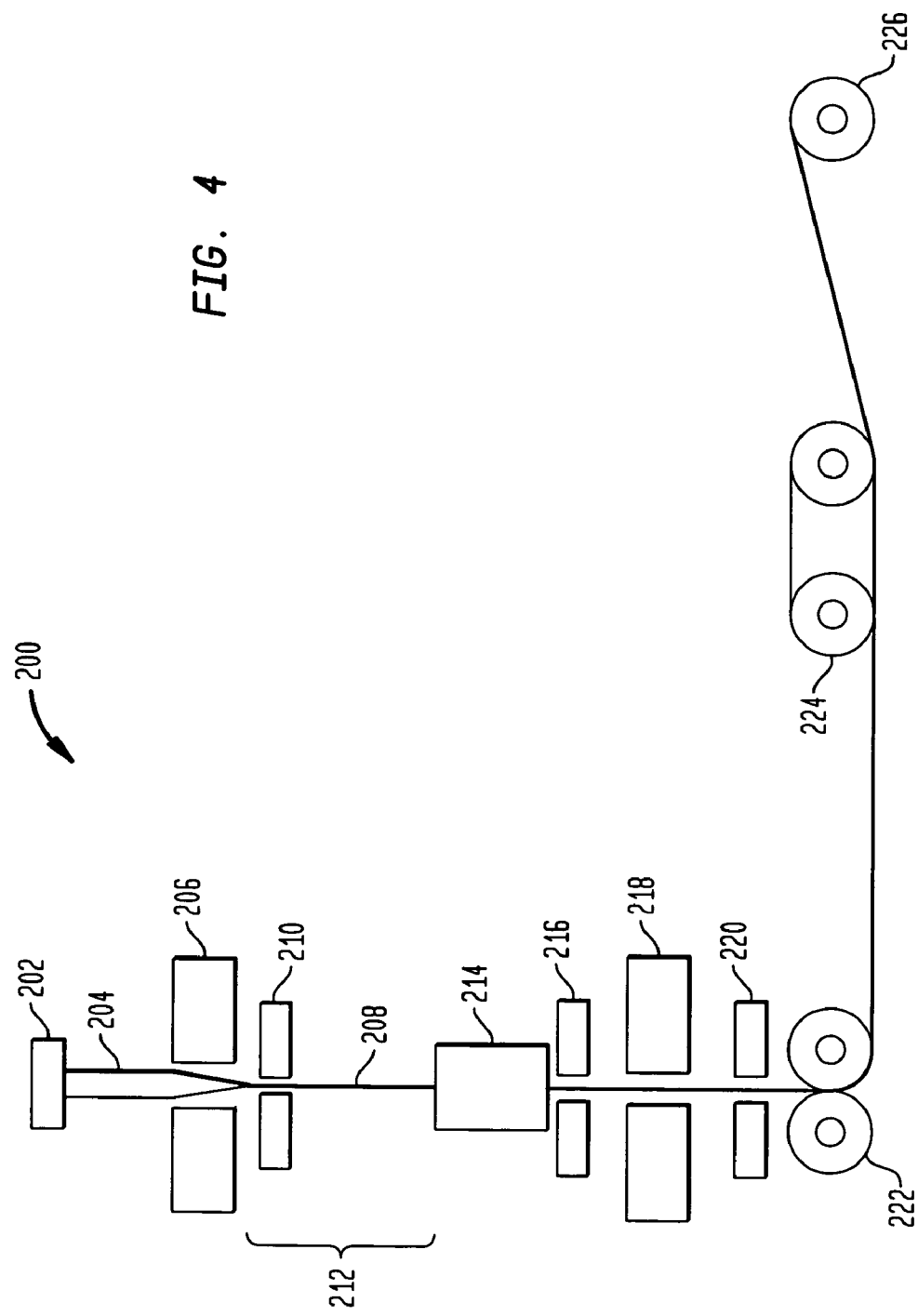

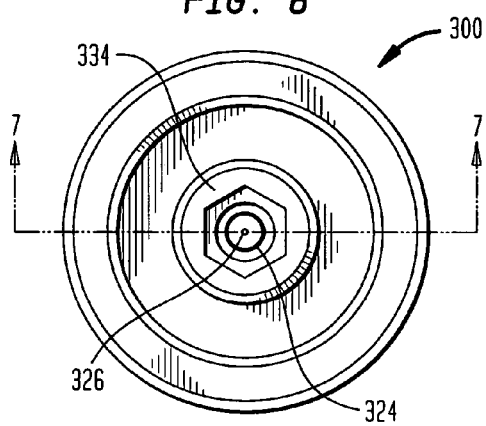
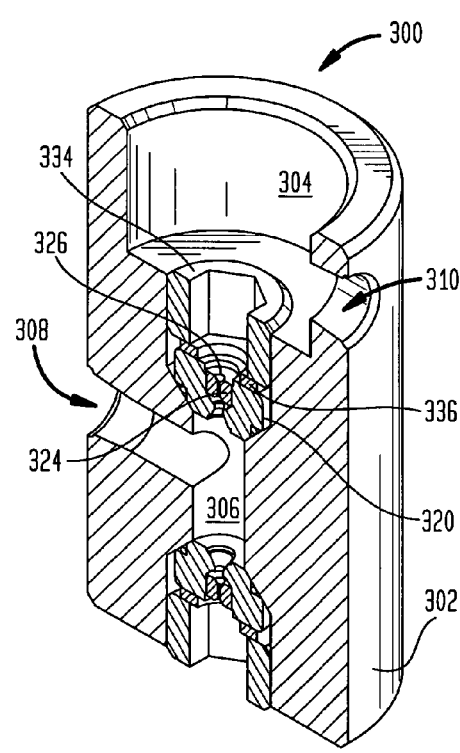
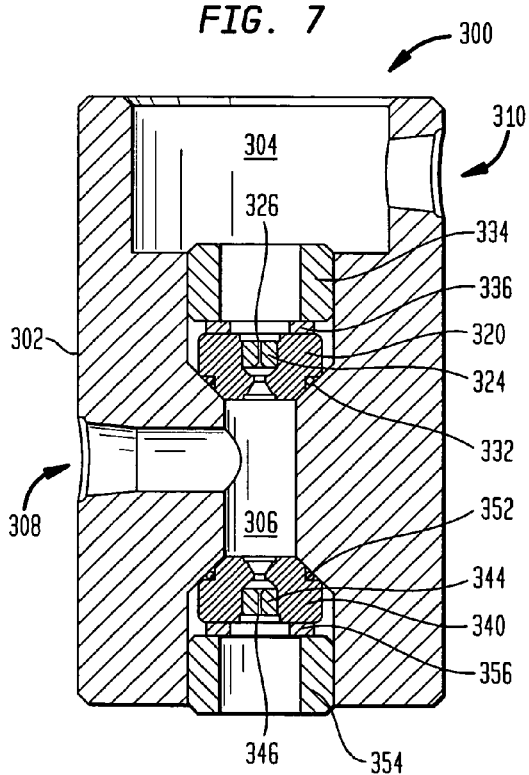

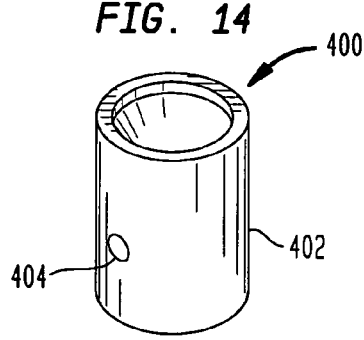
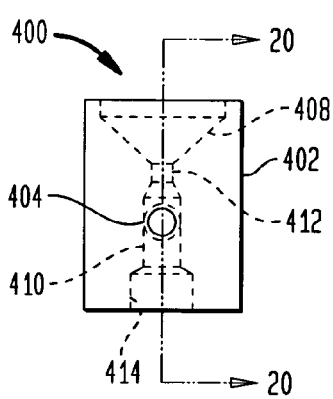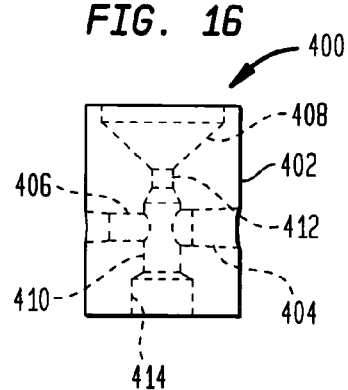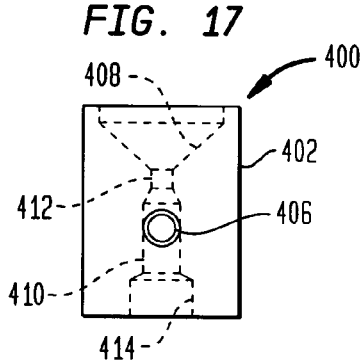
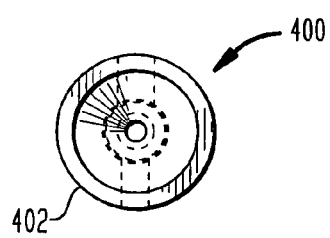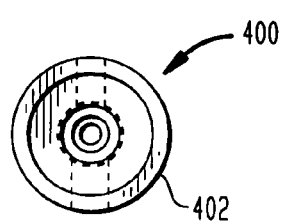
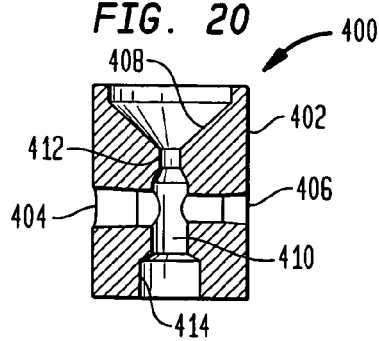

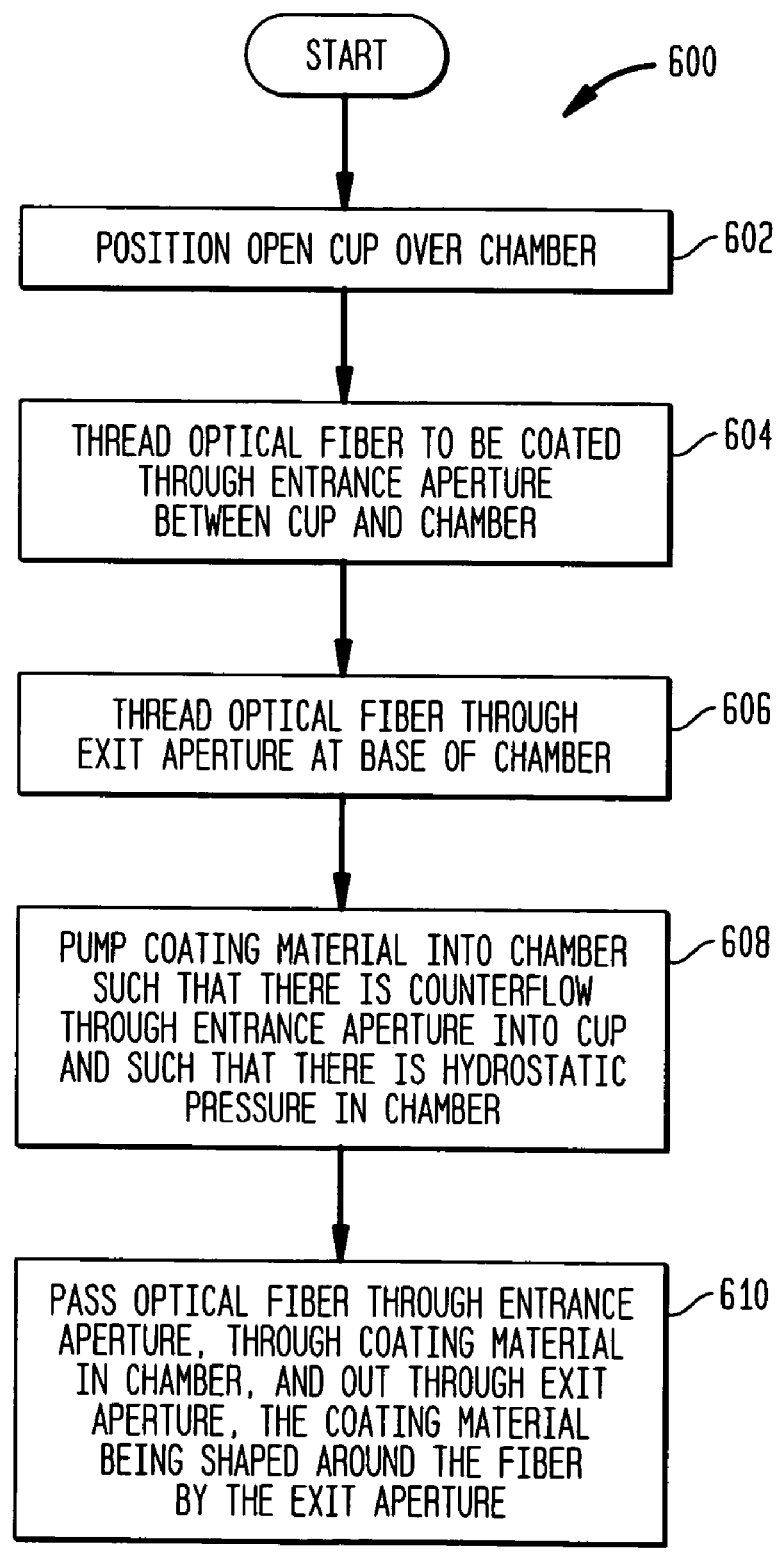

SYSTEMS AND METHODS FOR COATING OPTICAL FIBER

BACKGROUND OF THE INVENTION

1. Field of the Invention

The present invention relates generally to improvements in the field of fiber optics, and more particularly to advantageous aspects of systems and methods for applying a coating to an optical fiber.

2. Description of Prior Art

Optical fiber is typically coated as part of the manufacturing process. It is advantageous for the coating material to be applied as quickly as possible. However, it is also important for the coating material to be applied uniformly around the fiber, and for the fiber to be centered within the coating material. Although systems have been developed in the prior art for applying coating material, these systems suffer from certain limitations.

For example, issues have arisen with respect to coating a fiber with a coating material having a viscosity lower than 100 centipoises. Where a lower viscosity coating material is used, it has proven necessary to reduce processing speeds in order to maintain the quality of the coated fiber. At higher processing speeds, it has been found that there is a tendency for bubbles to form in lower viscosity coating materials. These bubbles tend to produce defects in the applied coating. It has also been found that, at higher processing speeds, it is difficult to maintain the centering of the fiber within the coating.

SUMMARY OF INVENTION

The above issues, and others, are addressed by the present invention, one aspect of which provides a fiber coating applicator, comprising a chamber and a cup positioned over the chamber. The cup is connected to the chamber by an entrance aperture. The chamber includes an exit aperture opposite the entrance aperture. The cup, entrance aperture, chamber, and exit aperture define a pathway for a fiber to be coated. The chamber further includes an input port for pumping a coating material into the chamber. The entrance aperture is dimensioned such that as a fiber travels along the pathway and coating material is pumped into the chamber, coating material travels upward through the entrance aperture around the fiber into the cup, the upward flow of coating material being restricted by the fiber and entrance aperture such that there is a desired hydrostatic pressure in the chamber. The exit aperture is dimensioned to suitably shape coating material around a fiber traveling along the pathway.

Additional features and advantages of the present invention will become apparent by reference to the following detailed description and accompanying drawings.

BRIEF DESCRIPTION OF DRAWINGS

FIG. 4 shows a draw tower including an applicator system, such as the applicator system shown in FIG. 3.

FIG. 5 shows a cutaway perspective view of an applicator according to a further aspect of the invention.

FIG. 6 shows a top view of the applicator shown in FIG. 5.

FIG. 7 shows a cross section of the applicator shown in FIGS. 5 and 6 through the plane 7—7.

FIG. 14 shows a perspective view of an applicator according to a further aspect of the invention.

FIGS. 15–19 show, respectively, front, side, rear, top, and bottom views of the applicator shown in FIG. 14.

FIG. 20 shows a cross section of the applicator shown in FIG. 15 through the plane 20—20.

FIG. 23 shows a flowchart of a method according to an aspect of the invention for coating a fiber.

DETAILED DESCRIPTION

An aspect of the invention provides an apparatus for applying a coating to a fiber. As described below, the apparatus can be used to apply a low viscosity coating material at high speeds, but may also be used with coating materials having higher viscosities. The present invention is described with respect to the application of a coating to an optical fiber as part of a draw process. However, it should be noted that the invention may also be used in other contexts. For example, the invention may be used to apply a coating to an optical fiber outside of a draw tower. The invention may also be used to apply a coating to a fiber or fiber-like structure other than an optical fiber.

As described in detail below, a coating applicator according to an aspect of the invention provides a semi-pressurized chamber that creates a "counterflow" of coating material in an upward direction opposite to the downward movement of fiber through the applicator. As discussed below, this counterflow reduces bubbles during the coating process and also exerts a centering force that improves centering of the fiber at the shaping die. The use of counterflow also improves control of coating thickness and uniformity. Compared with conventional applicators, an applicator according to the present invention allows for increased processing speeds, lowered costs, simplified operation, and improved coating quality.

Figure 1:
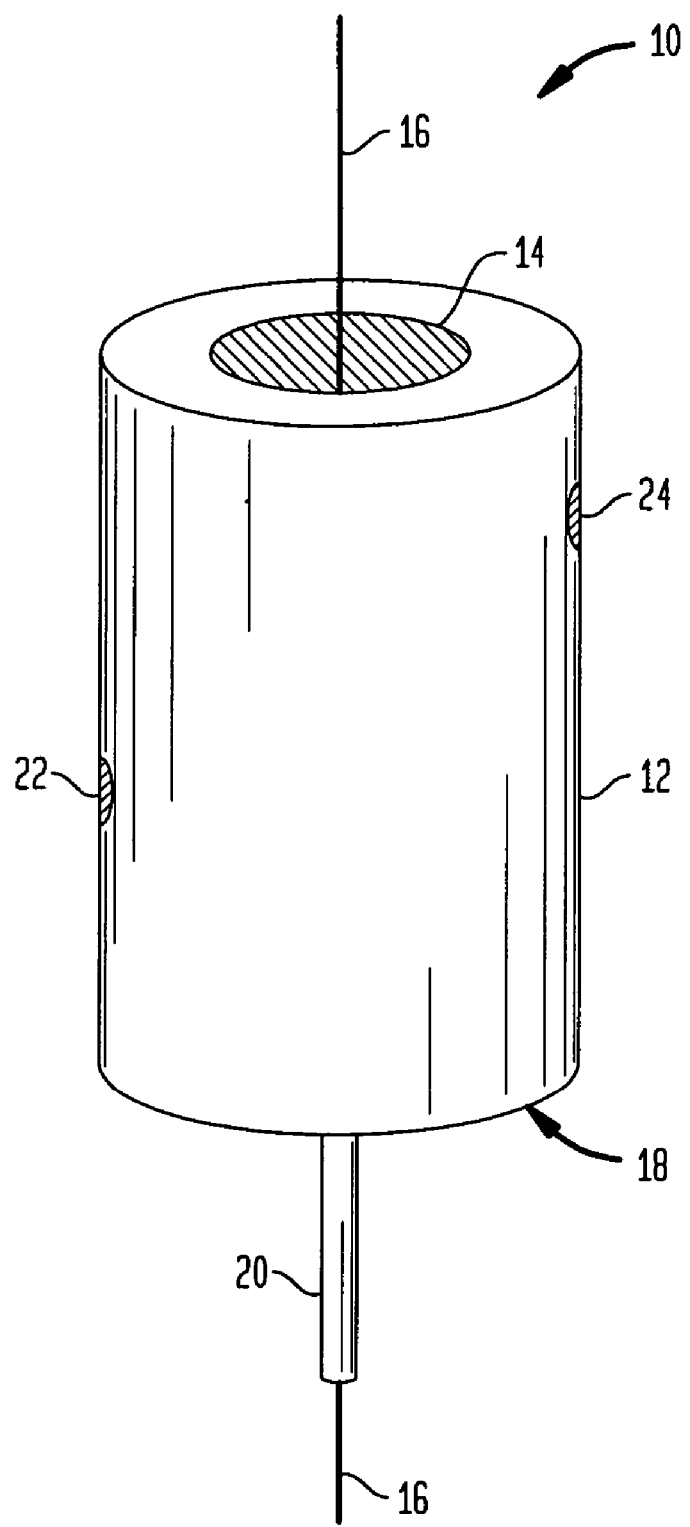
FIG. 1 shows a perspective view of an applicator according to a first aspect of the invention.

FIG. 1 shows a perspective view of an applicator 10 according to a first aspect of the invention. According to this aspect of the invention, the applicator 10 includes a cylindrical body 12 having an upper opening 14 for receiving an optical fiber 16 to be coated. The fiber 16 passes downward through the applicator 10, which contains a coating material. The fiber 16 exits the applicator's bottom end 18 with an applied coating 20. The coating 20 may be subsequently cured using a suitable technique, such as exposure to ultraviolet light at a curing station.

The applicator 10 further includes an input port 22 for pumping coating material into the applicator 10 and a drain port 24 for draining excess coating material out of the applicator. Because of the upward counterflow of coating material through the applicator, the drain port 24 is located above the input port 22. It should be noted that although the applicator 10 is shown in FIG. 1 as being formed from a unitary body 12, it would also be possible, as described below, to construct an applicator 10 using separate elements that are suitably mounted or joined with respect to each other.

Figure 2:
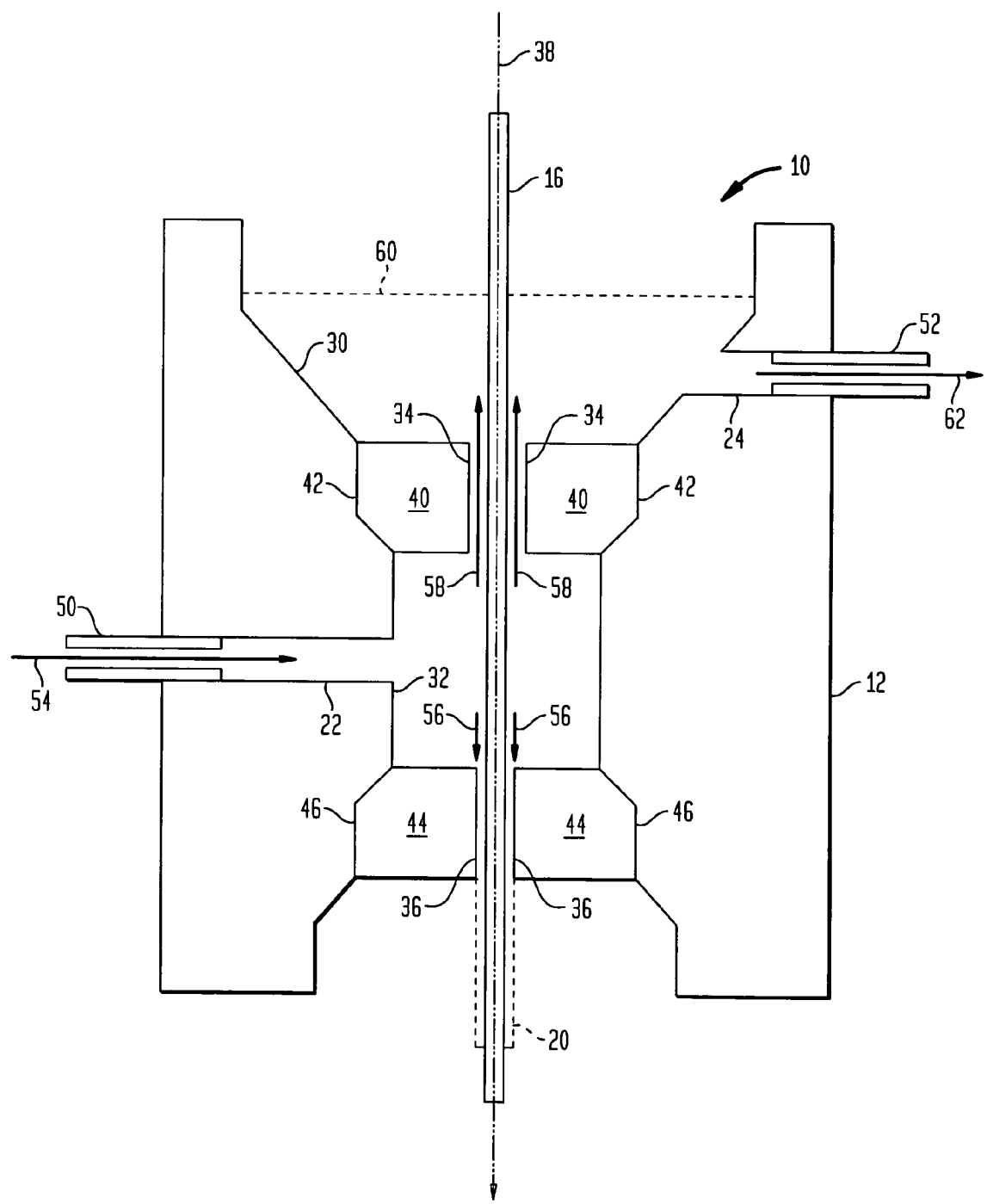
FIG. 2 shows a cross section of the applicator shown in FIG. 1.

FIG. 2 shows a cross section, not drawn to scale, of the coating applicator 10 shown in FIG. 1. The applicator 10 includes an open cup 30 that is positioned over a chamber 32. It will be seen that the upper portion of the cup 30 forms the upper applicator opening 14 shown in FIG. 1. The cup 30 and chamber 32 are connected to each other by an entrance aperture 34. At the bottom of the chamber 32, opposite the entrance aperture 34, there is provided an exit aperture 36.

The cup 30, entrance aperture 34, chamber 32, and exit aperture 36 together define a coating pathway 38 along which a fiber 16 to be coated travels into, through, and out of the applicator 10. As illustrated by arrow 54, coating material 60 is pumped into the chamber 32 through the input port 22. A suitable input fitting 50, such as a nipple, has been mounted into port 22. The entrance aperture 34 is dimensioned so that when a fiber 16 travels down the coating pathway 38, there is sufficient clearance at the entrance aperture 34 around the fiber 16 to allow coating material 60 to flow upward into the cup 30. As illustrated by arrow 62, excess coating material 60 drains out of the cup 30 through the drain port 24. As shown in FIG. 2, a suitable output fitting 52 is mounted into the output port 24. As described below, according to a further aspect of the invention the excess coating material may be recirculated for pumping back into the input port 22.

According to an aspect of the invention, the entrance aperture 34 is implemented using an entrance die assembly 40 that is mounted into a first opening 42 formed in the applicator body 12 between the cup 30 and the chamber 32. The exit aperture 36 is implemented using a shaping die assembly 44 that is mounted into a second opening 46 at the bottom of the chamber 32 leading to the exterior of the applicator body 12. It should be noted that it would also be possible to form the entrance and exit apertures 34 and 36 directly into the body 12 without the use of die assemblies 40 and 44. However, die assemblies 40 and 44 are useful for a number of reasons. First, they provide flexibility, as they allow different sizes of apertures 34 and 36 to be used, as desired. In addition, using removable die assemblies provides access to the interior of the applicator body 12, which facilitates cleaning or other maintenance operations.

As illustrated by arrows 56, a certain amount of coating material flows downward, out through exit aperture 36, and around fiber 16, where it forms a coating 20. Arrows 58 illustrate the counterflow of coating material up through entrance aperture 34, and around fiber 16, into cup 30. The fill level of the cup 30 may vary, depending upon a number of parameters, including the dimensions of the various elements of the applicator 10, the viscosity of the coating material used, and the pressure at which the coating material is introduced into the chamber 32.

According to a further aspect of the invention, the coating material 60 contained in the chamber 32 has a predetermined induced pressure above atmospheric pressure. The appropriate pressurization of the chamber 32 is accomplished by choosing a diameter for the entrance aperture 34 such that when coating material is pumped into the chamber 32, there is sufficient resistance to flow at the entrance aperture 34 to allow a desired hydrostatic pressure to build up within the chamber 32. It should be noted that, although the coating material contained in the chamber 32 is pressurized, it has been found that turbulence in the coating material in the cup 30 does not exceed manageable levels, even at higher processing speeds. It has been observed that the counterflow tends to draw bubbles upward into the cup, and away from the chamber 32 and exit aperture 36. As mentioned above, bubbles in the coating material contribute to defects and lack of uniformity in the fiber coating. It has also been found that inducing a predetermined hydrostatic pressure in the coating material contained in the chamber 32 provides some control over coating thickness. Increasing this pressure causes a slight increase in coating thickness. This ability to control coating thickness may be used to make small adjustments to the coating thickness without having to use a different die. In prior art systems, the coating thickness is strictly limited by the size of the shaping die used.

It should be noted that the invention may be practiced using a relatively large entrance aperture 34 and thus with a relatively small increase in the hydrostatic pressure of the coating material contained in the chamber 32. A large entrance aperture 34 may be desirable to allow the fiber 16 to pass freely through the aperture 34, to minimize turbulence in the coating material 60 and to avoid any centering issues that may arise in connection with a smaller entrance aperture 34. However, even with a relatively large entrance aperture 34, it has been found that it is still possible to significantly increase coating speeds, while maintaining high coating quality.

Figure 3:
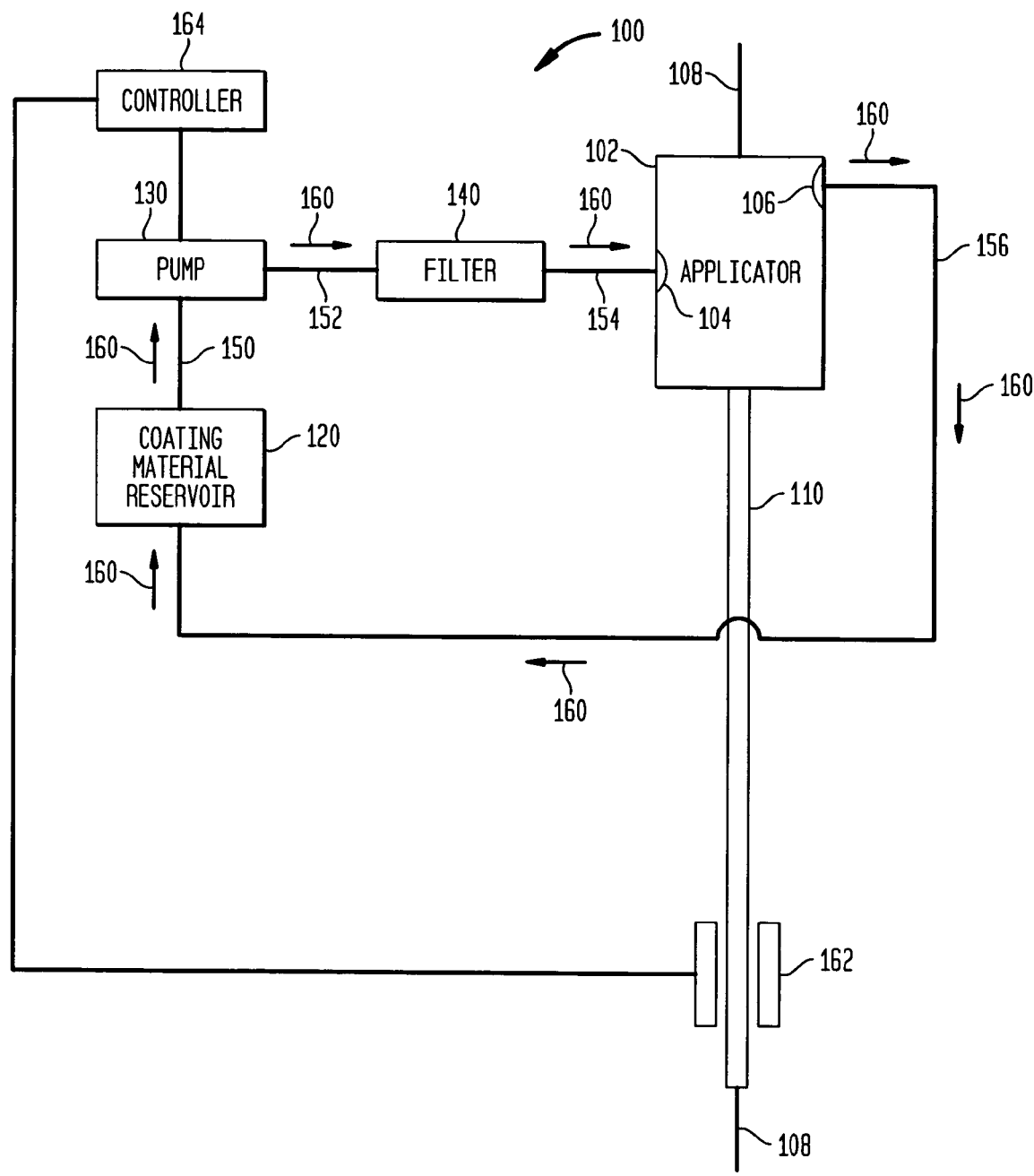
FIG. 3 shows an applicator system including an applicator, such as the applicator shown in FIGS. 1 and 2.

FIG. 3 shows a coating applicator system 100 according to a further aspect of the invention. The system 100 includes an applicator 102, such as the applicator 10 illustrated in FIGS. 1 and 2, and discussed above. The applicator 102 includes an input port 104 for receiving a coating material and an output port 106 for draining excess coating material. The applicator 102 receives an optical fiber 108, which enters at the top of the applicator 102 and exits out the bottom, covered with a coating 110.

As shown in FIG. 3, coating material is contained in a reservoir 120, such as a bottle. A pump 130 pumps coating material from the reservoir 120 through a filter 140 into the input port of the applicator 102. Excess coating material drains out of the applicator 102 through the drain port 106 and is recirculated back into the reservoir 120. Suitable connectors 150–156, such as piping or tubing, connect the reservoir 120, pump 130, filter 140, and applicator 102. Arrows 160 illustrate the direction of flow of the coating material through the system 100. The recirculation of the coating material saves on material. However, it would also be possible to use the present invention in a system in which coating material is not recirculated. According to one aspect of the present invention, pump 130 is a peristaltic pump, although other suitable types of pumps may be used without departing from the spirit of the invention.

It will be seen that the system shown in FIG. 3 may be modified without departing from the spirit of the invention. For example, some or all of the reservoir 120, pump 130, and filter 140 may be combined into a single unit. Also, the applicator drain port 106 may feed directly to the pump 130 rather than back into the reservoir 120.

The system shown in FIG. 3 further illustrates a feedback system according to a further aspect of the invention for controlling coating thickness. As discussed above, hydrostatic pressure of the coating material within the applicator 102 may be used to control the thickness of the fiber coating 110. An increase in pressure produces an increase in the thickness of the coating. Thus, a feedback loop may be used to control the thickness of the coating.

As shown in FIG. 3, a thickness monitor 162 or other suitable sensing device is used to provide an ongoing measurement of the thickness of the fiber coating 110. The fiber thickness is fed back to a controller unit 164 that controls the pump 130. Feedback can be used to achieve and maintain a desired coating thickness. If the monitor 162 senses that the thickness of the fiber coating 110 departs from the desired coating thickness, the controller makes a suitable adjustment to the pump 130. For example, if it is detected that the fiber coating is dropping below a desired thickness, the controller 164 may cause the pump 130 to increase its pumping speed, causing an increase in the pressure of the coating material within the applicator 102 and thus an increase in the fiber coating thickness. If it is detected that the fiber coating is exceeding a desired thickness, the controller 164 may cause the pump 130 to decrease its pumping speed, causing a decrease in the pressure of the coating material within the applicator 102 and thus a decrease in the fiber coating thickness. It should be noted that the invention may also be practiced without using this feedback feature.

FIG. 4 shows an exemplary optical fiber draw tower 200 incorporating a coating applicator system 214, such as the applicator system shown in FIG. 3 and described above. A preform 204 is loaded into a preform feed mechanism 202, which lowers the preform 204 into a furnace 206, causing the preform 204 to melt. A portion of the molten preform drops off, trailing behind it an optical fiber 208. A monitor 210 monitors the outer diameter of the fiber 208, which hardens as it passes through a cooling region 212. The cooled fiber is then fed through the coating applicator system 214, such as the applicator system shown in FIG. 3. Another monitor 216 monitors the concentricity of the fiber coating, which is then cured by curing lamps 218. Another monitor 220 monitors the coating diameter. Capstans 222 maintain speed and tension of the coated fiber 208, which is then passed through a proof test 224 and loaded onto a take-up spool 226.

FIG. 5 shows a cutaway view of an applicator 300 according to a further aspect of the invention. FIG. 6 shows a top view of the applicator 300, and FIG. 7 shows a cross section of the applicator 300 through the plane 7—7 shown in FIG. 6. As shown in FIGS. 5–7, the applicator 300 includes a body 302 in which there is formed an open cup 304 positioned over a chamber 306. The body 302 further includes an input port 308 leading into the chamber 306 and a drain port 310 leading out of the open cup 304.

Figure 8:
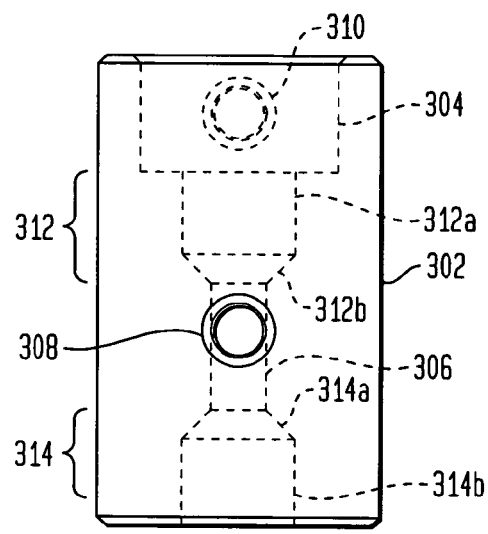
FIG. 8 shows an elevation view of an applicator body suitable for use in the applicator shown in FIGS. 5–7.
Figure 9:
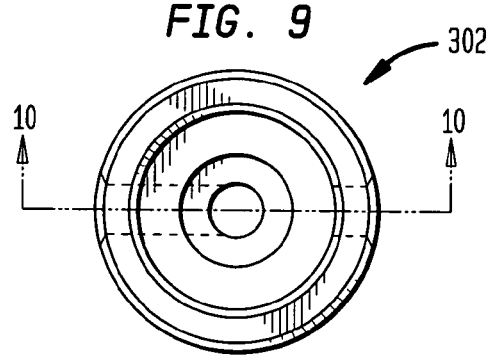
FIG. 9 shows a top view of the applicator body shown in FIG. 8.
Figure 10:
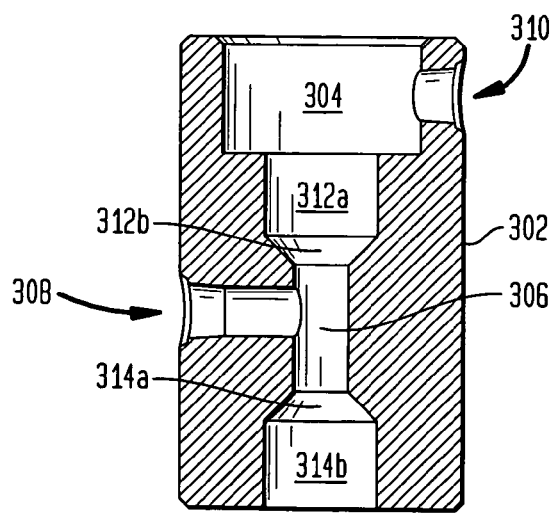
FIG. 10 shows a cross section of the applicator body shown in FIG. 9 through the plane 10—10.

FIG. 8 shows an elevation view of the applicator body 302, with the internal applicator components removed for purposes of illustration. FIG. 9 shows a top view of the applicator body 302, and FIG. 10 shows a cross section of the applicator body 302 through the plane 10—10. As shown in FIGS. 8 and 10, the cup 304 and chamber 306 are connected to each other by a first opening 312 that includes a cylindrical portion 312a and an inverted frustoconical portion 312b. At the base of the chamber 306, there is provided a second opening 314 including a frustoconical portion 314a and a cylindrical portion 314b. As described below, the first and second openings 312 and 314 are shaped to receive the internal applicator components. The applicator body 302 may be suitably fabricated, for example, by machining the cup 304, chamber 306 and other internal components of the applicator body 302 into a suitably dimensioned solid brass cylinder.

Figure 11:
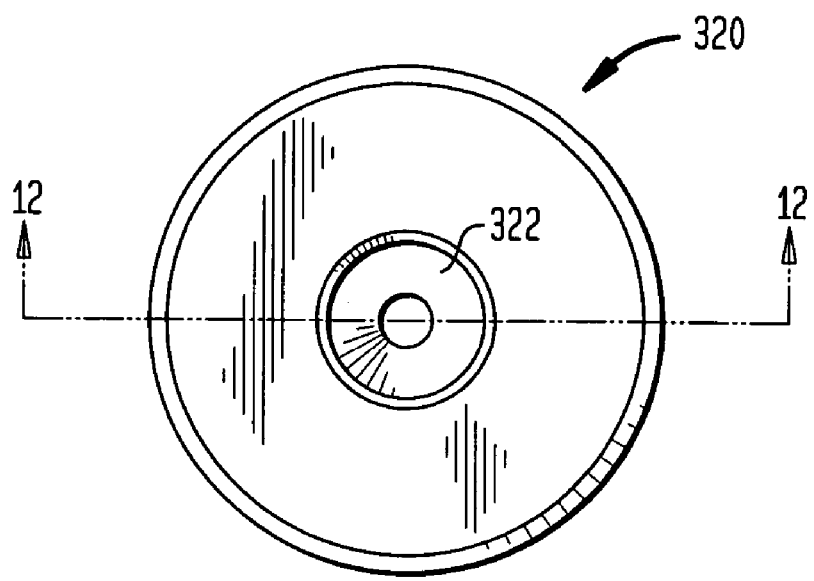
FIG. 11 shows a top view of a die insert suitable for use in the applicator shown in FIGS. 5–7.
Figure 12:
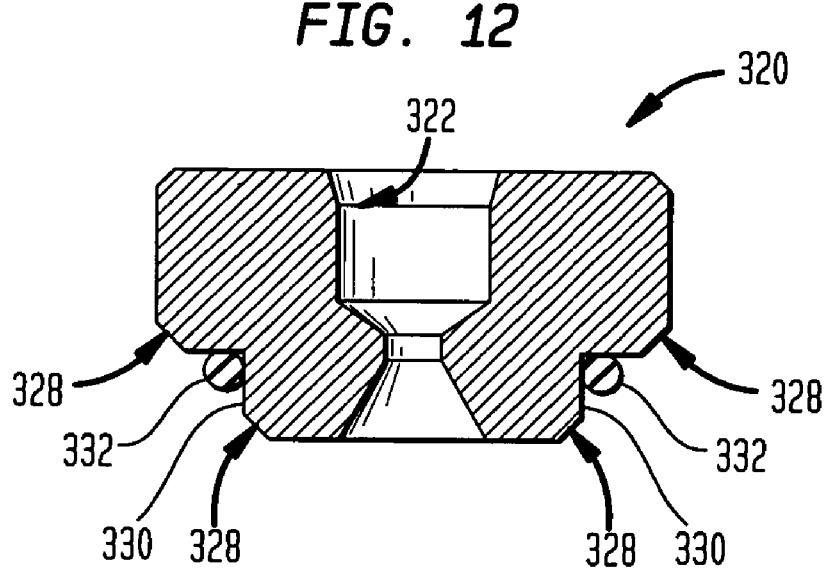
FIG. 12 shows a cross section of the die insert shown in FIG. 11 through the plane 12—12.

Returning to FIGS. 5–7, the applicator 300 further includes an entrance die assembly insert 320. FIG. 11 shows a top view of the entrance die assembly insert 320 and FIG. 12 shows a cross section of the entrance die assembly insert 320 through the plane 12—12. As shown in FIG. 12 the entrance die assembly insert 320 includes a cavity 322 for receiving a die nib 324, as shown in FIGS. 5 and 7. The die nib 324 has an entrance aperture 326 therein, which is dimensioned to allow an optical fiber to pass therethrough with sufficient clearance so that counterflow results, as described above.

Returning to FIG. 12, the insert 320 has a bottom portion defining surfaces 328 that are shaped to seat in the inverted frustoconical portion 312b of the opening 312 between the cup 304 and the chamber 306, shown in FIG. 8. The bottom portion of the insert 320 further includes a notch 330 for receiving an O-ring 332 that forms a fluid-tight seal around the insert 320 when it is seated in opening 312. The cylindrical portion 312a of the opening 312 is threaded to receive a hex hollow set screw 334, shown in FIGS. 5–7, which is used to hold the insert 320 in position. A washer 336 separates the set screw 334 from the insert 320.

As shown in FIGS. 5 and 7, there are further provided a number of internal components mounted into the applicator's lower opening 314 shown in FIGS. 8 and 10. These components include a second insert 340 having a cavity therein for receiving a shaping die nib 344. The shaping die nib 344 includes an exit aperture 346 therein that is dimensioned to shape coating material around an optical fiber. A second O-ring 352 provides a fluidtight seal around the second insert 340. The cylindrical portion 314b of the lower opening 314 is threaded to receive a second set screw 354 for holding the second insert 340 in position. A second washer 356 separates the second set screw 354 from the second insert 340.

For purposes of illustration, there is now provided an example of the use of the present invention to apply a specific type of coating to a specific type of optical fiber. However, it will be appreciated that it is not intended to limit the scope of the invention to the particulars of the present example.

In the present example, an applicator, such as the applicator 300 shown in FIGS. 5–12 and discussed above, is used to apply a coating to a hard-clad silica (HCS) fiber fabricated by OFS. The fiber has an uncoated diameter of 200 microns, and a coated diameter of 225 microns.

The coating material is a UV-curable fluoroacrylate, similar in chemistry to a standard telcom acrylate but much thinner in viscosity. As such, it can only be applied in a thin layer because there is insufficient viscous drag to allow a thicker coated layer. For HCS products manufactured by OFS, the HCS coating has a thickness of approximately 10–20 microns, with a target thickness of 12 microns. The coating material is applied at a temperature of approximately 50° C. The viscosity of the coating material at this temperature is approximately 40 centipoises, which is slightly thinner than water at the same temperature.

In this example, the applicator was fabricated by machining a solid brass cylinder having a base diameter of 2.5 inches and a height of 4 inches. The chamber is cylindrical in shape, having a bore diameter of 0.5 inches. The chamber separates the entrance die and the shaping die by a distance of 1.5 inches. The input and output ports have a diameter of 0.25 inches.

The entrance die and the shaping die are commercially available dies manufactured by Sancliff, Inc., Worcester, Mass. As illustrated in FIGS. 5–7, the dies are press fit into die assembly inserts which are held in the applicator body by set screws. The shaping die has an aperture with a diameter of approximately 9.3 mils. The entrance die has an aperture with a diameter of approximately 30 mils.

The relatively large diameter of the entrance die aperture allows a relatively free counterflow of coating material upward into the cup, with relatively little buildup of hydrostatic pressure within the chamber. It is estimated that the hydrostatic pressure of the coating material in the chamber is less than 1 psi above atmospheric pressure. It has been observed that the counterflow of coating material, even with a relatively small buildup of hydrostatic pressure, produces a significant increase in processing speed while maintaining coating quality. It is therefore believed that, in the present example, the dimensions of the applicator chamber are not critical, so long as there is counterflow of coating material from the chamber into the cup. Where, however, it is desired to achieve a greater amount of hydrostatic pressure within the chamber, the height of the chamber could have some effect on the hydrostatic pressure at the sizing die.

One reason for using an entrance die having an aperture with a diameter of 30 mils is that there is some concern that the bare glass fiber entering the applicator may scrape against the die. However, a smaller entrance die may be used, particularly if it is determined that the smaller die increases control without sacrificing fiber strength. Also, the dimensions of the entrance die and the shaping die may be varied to accommodate different fiber products to be coated using the described applicator.

In the present example, a Cole-Parmer Masterflex peristaltic pump is used to pump coating material into the applicator. The peristaltic pump is controlled by a suitable pump drive. One commonly used pump drive suitable for use in the described example is the L/S Variable Speed Economy Console Drive (A-07554-80). The pump head used, which includes the roller assembly that pushes along the coating material input tube, is the L/S Easy-Load Pump Head (A-07518-10) along with L/S-14 food grade tubing. The pump is operated at a speed of 1 revolution per second. For this particular pump and tube size, this pump speed corresponds to 0.21 milliliters per second. At higher draw speeds, the volumetric flow rate is increased to counter the bubble ingression. In high speed tests, the pump speed was increased to over 10 revolutions per second, that is, greater than 2.00 milliliters per second.

During the coating process, the HCS fluoroacrylate coating material is pumped out of a brown chemical bottle that is heated by a hot plate. The coating material is constantly mixed by a stirrer. The peristaltic pump circulates coating material from the bottle, through a filter, and into the applicator chamber. The coating material counterflows upward into the cup portion of the applicator. Gravity causes the coating material to drain back into the bottle. Thus, the coating material entering the chamber is always relatively pure because it passes through the filter. The higher pumping speeds used in connection with the present invention tend to keep the coating material components, including monomers, photoinitiators, and the like, well mixed before application.

In the present example, the uncoated fiber diameter is 200 microns, and the coated fiber diameter is 225 microns. However, tests have been performed successful on other fibers:

125 micron fiber—30 mil entrance die, 5.5 mil shaping die;

400 micron fiber—30 mil entrance die, 17.4 mil shaping die;

600 micron fiber—80 mil entrance die, 25 mil shaping die.

It is believed that the present invention may be used for any number of other fiber sizes, including fibers having diameters as large as 1,500 microns. It has also been found that the applicator is suitable for use with higher viscosity coatings, such as other acrylates, or silicone.

It has been found that the described applicator allows draw speeds to be increased significantly. Good coating application has been demonstrated experimentally at a wide range of draw speeds, including draw speeds that are double previous draw speeds, and beyond those speeds. It has been found that one limit to increasing draw speeds is that at higher draw speeds fiber temperature increases to a point that starts to cause the coating material to evaporate. It is believed that with a suitable cooling device, such as a cooling tube, it would be possible to increase draw speeds even further.

Figure 13:
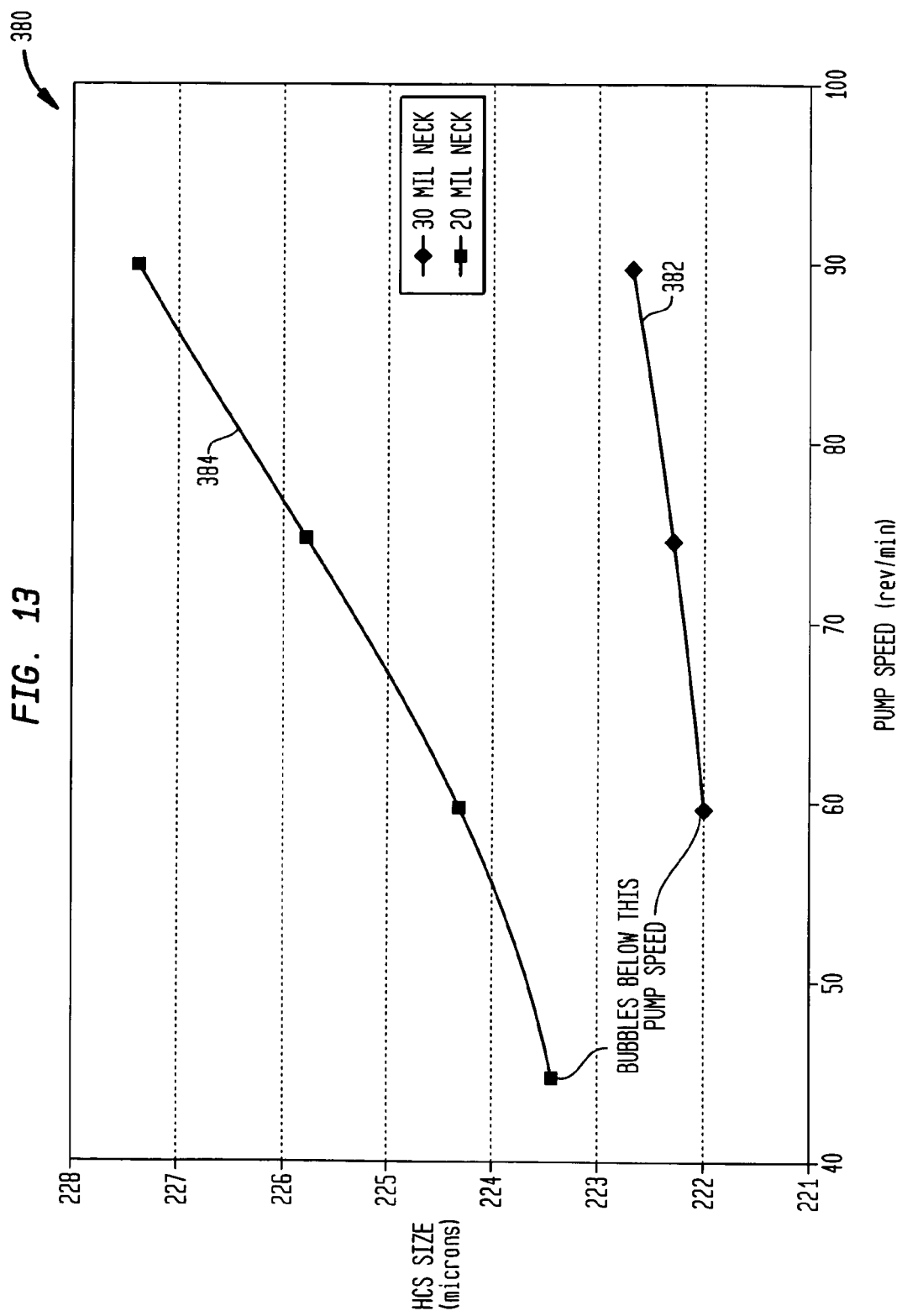
FIG. 13 shows a graph illustrating examples of the relationship between pump speed and coated fiber diameter using an applicator, such as the applicator shown in FIGS. 5–7.

As discussed above, according to an aspect of the present invention, the thickness of the applied coating material may be controlled by controlling the pressure of the coating material within the applicator. This aspect of the invention is illustrated in the graph 380 shown in FIG. 13.

The graph 380 illustrates the relationship between pump speed and the diameter of the coated fiber using the exemplary system described above. It will be appreciated that an increase in pump speed results in an increase in the pressure of the coating material within the applicator.

The lower trace 382 in the graph 380 illustrates the relationship between pump speed and fiber diameter when a 30 mil entrance die is used. The upper trace 384 illustrates this relationship when a 20 mil entrance die is used. From a comparison of the two traces 382 and 384, it will be seen that the relationship between pump speed and fiber diameter is more pronounced when a smaller entrance die aperture is used. The difference between the two traces 382 and 384 arises because the use of a smaller entrance die causes a further restriction in flow and increases the pressure in the applicator chamber. Higher pump speeds also cause an increase in the volume of upward counterflow.

It can also be seen from the lower trace 382 that, using a 30 mil entrance die, the pump speed should be at least 60 revolutions per minute. At lower pump speeds, the coated fiber exiting the applicator exhibited bubbling. From the upper trace 384, it can further be see that, using a 20 mil entrance die, the pump speed should be at least 45 revolutions per minute.

FIGS. 14–20 show a series of drawings illustrating an applicator 400 according to a further aspect of the invention. The applicator 400 includes a cylindrical body 402. In order to provide flexibility, a front input port 404 and a rear input port 406 are provided. The front input port 404 has a larger diameter than the rear input port 406. In use, an operator selects one of the two input ports 404 and 406 for connection to a pump. The other input port is sealed off.

The applicator 400 includes an open cup 408 positioned over a chamber 410. A first opening 412 connects the cup 408 with the chamber 410. A second opening 414 connects the bottom of chamber 410 to the bottom exterior of the applicator 400. The first opening 412 is dimensioned to receive a first coating die (not shown), and the second opening 414 is dimensioned to receive a die assembly (not shown) containing a second coating die. The first coating die has an aperture dimensioned to allow an upward counterflow of the coating material around the fiber being coated. The second coating die has an aperture dimensioned to shape the coating around the fiber exiting the applicator 400. Suitable additional hardware may be mounted or otherwise joined to the top of the applicator 400 to allow excess coating material to be drained out of the cup 408. Such additional hardware may include, for example, bushings, connectors, and fittings.

Figure 21:
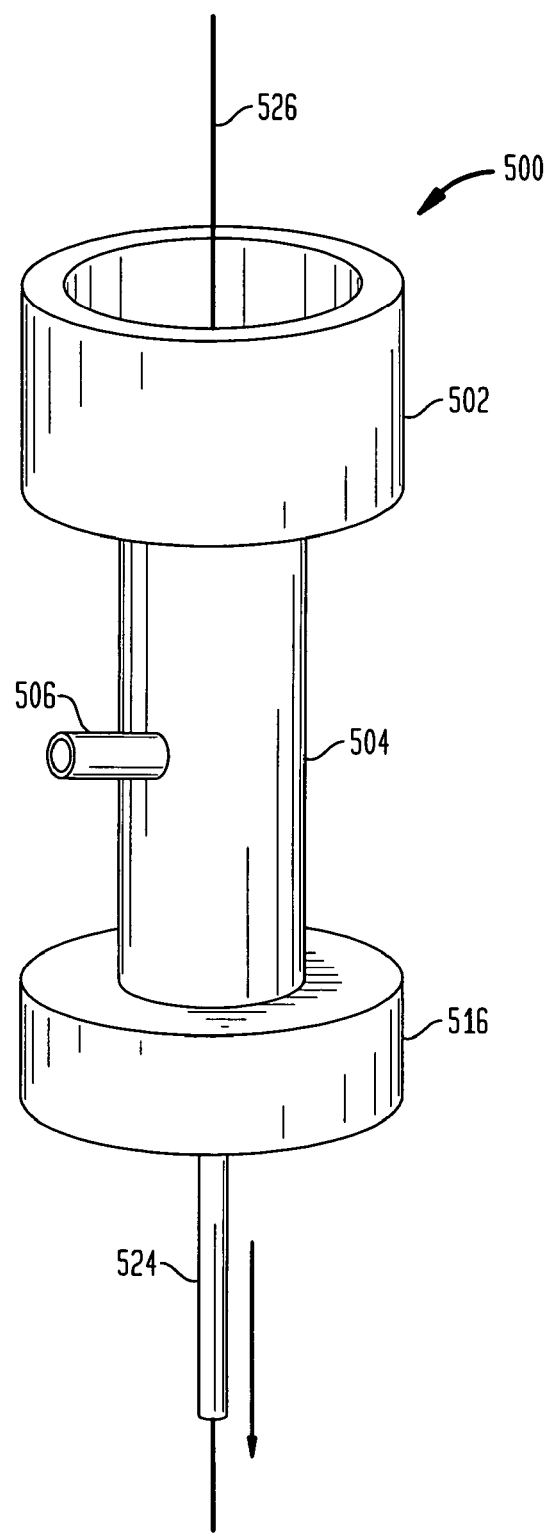
FIG. 21 shows a perspective view of an applicator according to a further aspect of the invention.
Figure 22:
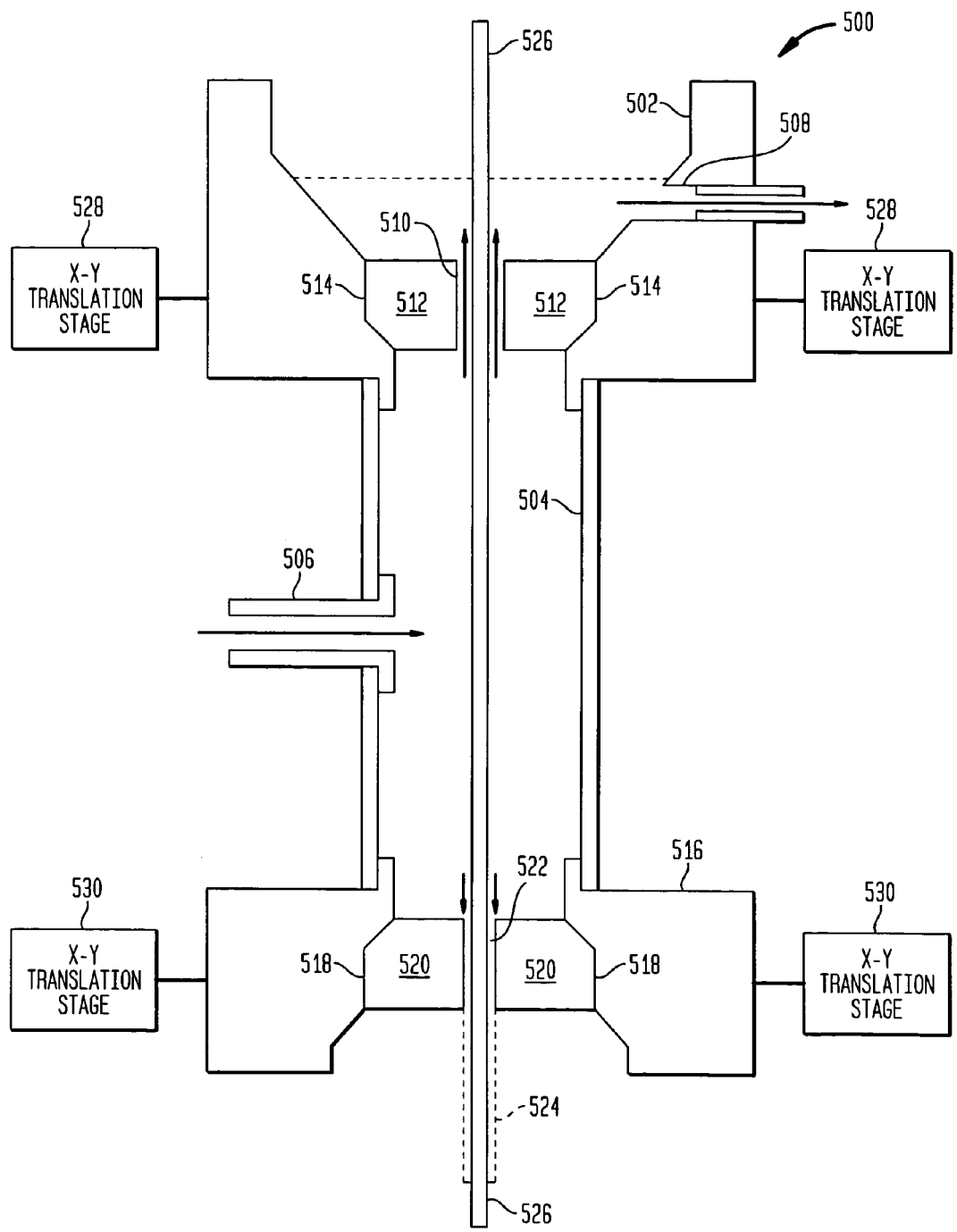
FIG. 22 shows a cross section of the applicator shown in FIG. 21.

FIG. 21 shows a perspective view of an applicator 500 according to a further aspect of the invention, and FIG. 22 shows a cross section of the applicator 500. According to this aspect of the invention, the applicator 500 includes a cup 502 and a chamber 504 that are formed from separate elements that are mounted to each other.

According to the present aspect of the invention, the chamber 504 is provided by a flexible gooseneck. The use of a flexible gooseneck allows the relative positions of the applicator components to be adjusted with respect to each other. The chamber 504 includes an input port 506 for pumping a coating material into the chamber 504. The cup 502 includes a drain port 508 for draining excess coating material out of the cup 502. The cup 502 and chamber 504 are connected by an entrance aperture 510 that is dimensioned to allow counterflow around an optical fiber passing through the entrance aperture 510.

As shown in FIG. 22, the entrance aperture 510 is provided by an entrance die assembly 512 that is seated in an opening 514 between the cup 502 and chamber 504. At the bottom of the chamber 504, there is provided a fitting 516 having an opening 518 therein in which there is mounted a shaping die assembly 520. The shaping die assembly 520 includes an exit aperture 522 therein that is dimensioned to shape a coating material 524 around a fiber 526.

In order to properly align the entrance aperture 510 and exit aperture 522, there is provided a first X-Y translation stage 528 controlling the X-Y position of the cup 502 and a second X-Y translation stage 530 controlling the X-Y position of the fitting 516. The concentricity of coated fiber exiting the applicator 500 is monitored, and the relative X-Y positions of the entrance and exit apertures 510 and 522 are adjusted, as needed. The issue of concentricity becomes increasingly important as the chamber 504 increases in length. Thus, in the applicator 300 illustrated in FIGS. 5–12, discussed above, because of the relatively short length of the chamber, it is possible to do without the X-Y translation stages shown in FIG. 22.

It should be noted that the system shown in FIGS. 21 and 22 may be used to refurbish an existing open cup system. For example, the cup 502 may be a cup used in a prior art fiber coating system. The prior art cup may be refurbished by attaching the other elements shown in FIGS. 21 and 22.

FIG. 23 shows a flowchart of a method 600 according to a further aspect of the invention for coating a fiber. In step 602, a cup is positioned over a chamber. In step 604, an optical fiber to be coated is threaded through an entrance aperture between the cup and the chamber. In step 606, the fiber is also threaded through an exit aperture at the base of the chamber. In step 608, coating material is pumped into the chamber such that there is a counterflow of coating material up through the entrance aperture around the fiber into the cup, and such that there is hydrostatic pressure in the chamber. In step 610, optical fiber is passed through the entrance aperture, through the coating material in the chamber, and out through the exit aperture. The coating material is shaped around the fiber by the exit aperture.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A fiber coating applicator, comprising:
a chamber,
a cup positioned over the chamber, and
an entrance die assembly mounted into a chamber entrance opening between the cup and the chamber,
the entrance die assembly including an entrance die insert mounted into an entrance fitting, the entrance fitting held in position by an entrance set screw that is screwed into the chamber entrance opening,
the entrance die insert having an entrance aperture therethrough connecting the cup to the chamber,
the chamber including an exit aperture opposite the entrance aperture, the cup, entrance aperture, chamber, and exit aperture defining a pathway for a fiber to be coated,
the chamber further including an input port for pumping a coating material into the chamber,
the entrance aperture being dimensioned such that as the fiber travels along the pathway and coating material is pumped into the chamber, coating material travels upward through the entrance aperture around the fiber into the cup, the upward flow of coating material being restricted by the fiber and entrance aperture such that there is a hydrostatic pressure in the chamber,
the exit aperture being dimensioned to shape coating material around the fiber.

2. The applicator of claim 1, wherein the cup further includes a drain port for draining excess coating material out of the cup.

3. The applicator of claim 1,
wherein the entrance aperture has a diameter of 30 mils and the exit aperture has a diameter of 9.3 mils,
wherein the coating material has a viscosity of 40 centipoises,
wherein the fiber has a diameter of 200 microns,
and wherein the applicator is used to apply a coating having a thickness of 10–20 microns onto the fiber.

4. A fiber coating applicator, comprising:
a chamber,
a cup positioned over the chamber, the cup connected to the chamber by an entrance aperture, and
a shaping die assembly mounted into a chamber exit opening in the chamber opposite the entrance aperture,
the shaping die assembly including an exit die insert mounted into an exit fitting, the exit fitting held in position by an exit set screw that is screwed into the chamber exit opening,
the exit die insert having an exit aperture therethrough opposite the entrance aperture, the cup, entrance aperture, chamber, and exit aperture defining a pathway for a fiber to be coated,
the chamber further including an input port for pumping a coating material into the chamber, the entrance aperture being dimensioned such that as the fiber travels along the pathway and coating material is pumped into the chamber, coating material travels upward through the entrance aperture around the fiber into the cup, the upward flow of coating material being restricted by the fiber and entrance aperture such that there is a hydrostatic pressure in the chamber, the exit aperture being dimensioned to shape coating material around the fiber.

5. The applicator of claim 4, wherein the cup further includes a drain port for draining excess coating material out of the cup.

6. The applicator of claim 4,
wherein the entrance aperture has a diameter of 30 mils and the exit aperture has a diameter of 9.3 mils,
wherein the fiber has a diameter of 200 microns,
and wherein the applicator is used to apply a coating having a thickness of 10–20 microns onto the fiber.

7. A fiber coating applicator, comprising:
a chamber, and
a cup positioned over the chamber, the cup connected to the chamber by an entrance aperture,
the chamber including an exit aperture opposite the entrance aperture, the cup, entrance aperture, chamber, and exit aperture defining a pathway for a fiber to be coated,
the chamber further including an input port for pumping a coating material into the chamber,
the entrance aperture being dimensioned such that as the fiber travels along the pathway and coating material is pumped into the chamber, coating material travels upward through the entrance aperture around the fiber into the cup, the upward flow of coating material being restricted by the fiber and entrance aperture such that there is a hydrostatic pressure in the chamber,
the exit aperture being dimensioned to shape coating material around the fiber,
the chamber including a flexible gooseneck, the applicator further including at least one translation stage for adjusting the relative positions of the entrance and exit apertures.

8. A fiber coating applicator, comprising:
a body in which there is formed a cup positioned over a chamber, the cup and chamber connected to each other by a chamber entrance opening,
the body further including a chamber exit opening at a base of the chamber opposite the chamber entrance opening,
the chamber entrance opening being threaded to receive an entrance set screw to hold an entrance die assembly in position, and the chamber exit opening being threaded to receive an exit set screw to hold a shaping die assembly in position,
the body further including an input port into the chamber for pumping a coating material into the chamber, and a drain port leading out of the cup for draining coating material out of the body,
the cup, chamber entrance opening, chamber, and chamber exit opening defining a coating pathway in which a fiber enters the body through the cup, passes through an entrance aperture in an entrance die mounted into the entrance die assembly, passes through the chamber, and exits the body through an exit aperture in an exit die mounted into the shaping die assembly,
the entrance aperture being dimensioned such that as the fiber travels along the coating pathway and coating material is pumped into the chamber, coating material travels upward through the entrance aperture around the fiber into the cup, with excess coating material being drained out of the cup through the drain port,
the upward flow of coating material being sufficiently restricted by the fiber and the entrance aperture such that there is a hydrostatic pressure in the chamber.

9. A fiber coating applicator, comprising:
a body in which there is formed a cup positioned over a chamber, the cup and chamber connected to each other by a chamber entrance opening,
the body further including a chamber exit opening at a base of the chamber opposite the chamber entrance opening,
the body further including first and second input ports leading into the chamber, the first and second input ports having different dimensions, for pumping a coating material into the chamber, and a drain port leading out of the cup for draining coating material out of the body,
the cup, chamber entrance opening, chamber, and chamber exit opening defining a coating pathway in which a fiber enters the body through the cup, passes through an entrance die mounted into the chamber entrance opening, passes through the chamber, and exits the body through a shaping die mounted into the chamber exit opening,
the entrance die having an entrance aperture dimensioned such that as the fiber travels along the coating pathway and coating material is pumped into the chamber, coating material travels upward through the entrance die around the fiber into the cup, with excess coating material being drained out of the cup through the drain port,
the upward flow of coating material being sufficiently restricted by the fiber and entrance die such that there is a hydrostatic pressure in the chamber.

* * * * *